United States Patent [19]
Custer et al.

[11] Patent Number: 5,573,813
[45] Date of Patent: Nov. 12, 1996

[54] METHOD AND APPARATUS FOR IMPREGNATING FIBERS WITH HIGHLY VISCOUS MATERIALS AND ARTICLE MADE THEREWITH

[75] Inventors: Milton F. Custer, Byron; Kenneth E. Vicknair, Pleasanton; William R. Sherwood, Bethel Island, all of Calif.

[73] Assignee: Hexcel Corporation, Dublin, Calif.

[21] Appl. No.: 487,554

[22] Filed: Mar. 2, 1990

[51] Int. Cl.$^6$ .................................................... B05D 3/12
[52] U.S. Cl. .................... 427/346; 118/423; 264/257; 427/358; 427/369; 427/370; 428/295
[58] Field of Search .................. 264/257; 427/346, 427/358, 369, 370, 398.2

[56] References Cited

U.S. PATENT DOCUMENTS

| | | | |
|---|---|---|---|
| 3,051,995 | 9/1962 | Ferrell et al. | 264/257 X |
| 3,765,817 | 10/1973 | Ancker | 425/325 |
| 4,312,917 | 1/1982 | Hawley | 428/375 |
| 4,327,130 | 4/1982 | Pipkin | 427/369 X |
| 4,439,387 | 3/1984 | Hawley | 264/108 |
| 4,804,509 | 2/1989 | Angell, Jr. et al. | 427/398.2 X |
| 4,871,491 | 10/1989 | McMahon et al. | 264/257 X |

FOREIGN PATENT DOCUMENTS

| | | | |
|---|---|---|---|
| 0007149 | 1/1980 | European Pat. Off. | 264/257 |
| 0270411 | 6/1988 | European Pat. Off. | 264/257 |
| 62-41007 | 2/1987 | Japan | 264/257 |
| 774031 | 5/1957 | United Kingdom . | |
| 908753 | 10/1962 | United Kingdom . | |
| 1332521 | 10/1973 | United Kingdom . | |

*Primary Examiner*—Richard D. Lovering
*Attorney, Agent, or Firm*—Townsend and Townsend and Crew LLP

[57] ABSTRACT

Fiber materials of unidirectional, parallel filaments are fully impregnated with highly viscous resins such as polymers having linear, long chain molecular structures, by heat softening the resin, applying it to opposite sides of the fiber material, subjecting it to low pressure (e.g. 4 psi) and generating shear stresses in a boundary layer of the pressurized resin immediately adjacent the faces of the fiber material to align the long chain molecules in the vicinity of the filaments substantially parallel to the filaments. Shear is generated by moving the material, including the applied resin, through a restricted passageway which defines a shear zone. While the resin is subjected to shear its viscosity is reduced to such an extent that it penetrates into the fiber material and substantially fully encapsulates the fibers with the resin.

30 Claims, 3 Drawing Sheets

METHOD AND APPARATUS FOR IMPREGNATING FIBERS WITH HIGHLY VISCOUS MATERIALS AND ARTICLE MADE THEREWITH

BACKGROUND OF THE INVENTION

Resin impregnated materials, commonly referred to as "prepreg" materials, are in wide use as sheets and tapes, for example, for molding relatively thin walled articles of often intricate shapes. Typically, such materials are made by applying a resin, e.g. polymerizable thermosetting or a heat softened thermoplastic), to bands of parallel fibers or filaments (for tapes) or to fabrics (for sheets) made by matting, knitting, weaving etc. fibers which extend in multiple directions.

To assure high quality finished articles made of prepreg materials the resin must fully penetrate the band or fabric, i.e. it must contact substantially the entire surfaces of all fibers. In other words, to obtain satisfactory end products the resin must effectively encapsulate the fibers.

Prepreg materials are extensively used in the aerospace industry because they yield parts which are relatively light weight, have good strength and are inexpensive to form into intricately shaped articles. In the past, thermosetting resins were preferred over thermoplastic resins because the latter had relatively low softening temperatures even though they had a number of highly desireable characteristics such as, for example, their ability to be reheated to remake a previously defectively formed part, or their greater impact resistance.

Recently, the aerospace industry has shown a strong interest in prepreg materials which use so-called engineered thermoplastic resins. A common characteristic of these resins is that they have a long chain, linear molecular structure. These materials differ from conventional thermoplastics in that they have relatively high melting or glass transition temperatures.

The problem encountered when using long chain thermoplastic polymers in prepreg materials is their highly viscous nature which makes it virtually impossible to impregnate any significant thickness of fiber materials, such as the above mentioned bands, sheets or mats, with them. Increasing the pressure of the heat softened polymer does not help because the intertwined long molecule chains cannot pass between the fibers and penetrate into the fiber material. Instead, the intertwined long molecules form a "log jam" over the surface of the fiber material because they are randomly oriented. When the pressure is increased, the molecular log jam across the surface of the fiber material has the tendency to limit the pressure to the side where it is applied which leads to lateral movement of the polymer rather than impregnation.

As a result long chain polymers are not extensively used for impregnation using hot melt techniques for the manufacture of prepreg materials in spite of the many desirable characteristics they have.

The problems encountered when using long chain polymers for prepreg materials is well known. U.S. Pat. No. 4,559,262 (Cogswell), for example, mentions the desirability of using thermoplastic resins, notes that such resins which have acceptable physical properties require a high molecular weight (typically in excess of 100 Ns/m$^2$) which renders the resin so viscous that the fibers cannot be adequately wetted, and then discloses that an acceptable compromise can be struck and prepregs having relatively desirable characteristics can be obtained with relatively low molecular weight thermoplastic resins which have a sufficiently low viscosity that adequate fiber wetting is possible. Of course, this prior art approach, though it may be an improvement over what occurred before, cannot make use of the much more desirable, high molecular weight and high viscosity thermoplastic resins because the process described in that patent is effectively limited to resins having a viscosity of no more than about 30 Ns/m$^2$, i.e., low molecular weight thermoplastics. The present invention makes it possible to use high molecular weight, long molecular chain resins of a viscosity as high as several hundred Ns/m$^2$ while assuring a thorough and complete wetting of the filaments and, therefore, a superior prepreg material.

SUMMARY OF THE INVENTION

Polymers having a long chain, linear molecular structure have a high tensile but a relatively low shear strength. The inventors have discovered that the low shear strength of these polymers can be exploited to thoroughly penetrate fiber materials with them by aligning the long chain molecules with the fibers and then forcing the polymer into intimate contact with the fibers. This makes it feasible to manufacture articles from long chain polymer impregnated prepregs and thereby obtain the many desirable characteristics of fiber materials impregnated with a high molecular weight as long molecular chain polymers.

When a heat softened long chain polymer is subjected to shear stresses, its viscosity can decrease dramatically so that, in this state, it can be made to penetrate even closely adjacent fibers. Once the fiber material, e.g., a band of parallel filaments or a woven fabric, has been fully penetrated by the resin so that it encapsulates substantially all fibers, high quality finished articles made therefrom are assured.

For purposes of this invention the process can use as the impregnating resin "thermoplastics" as well as other high molecular weight linear polymers. These materials will sometimes be collectively referred to herein as "long chain polymers" or simply as "resin(s)" irrespective of their specific chemical structure and irrespective of whether or not they are in fact polymers. These terms, as used herein, are meant to refer to compounds which have long linear molecular chains, typically of a length of 100 repeat units or more (corresponding to a molecular weight of about 10,000) and in any event of a length substantially greater than the spacing between adjacent fibers or filaments so that even the application of a relatively large pressure cannot force the molecules between and into full wetting contact with the fibers. These resins also exhibit a very high viscosity, typically in the range of about 300 Ns/m$^2$ or more, even when heated. In fact, due to the coiled or entangled nature of the polymer chain, raising the temperature typically has a negligible effect on the viscosity of the resin melt. Such "resins" are desirable for use in prepreg materials because they are relatively strong, resist fatigue and do not soften up to temperatures as high as 500° F. or more. Further, they are readily molded into intricate shapes with exceedingly simple and inexpensive molds such as wooden molds, for example.

Hence, the present invention can be employed with most viscous substances. Thus, a wide variety of long chain polymers can be locally "fluidized" in accordance with the present invention, including but not limited to thermoplastics such as polyimides (for example, polyetherimid available under the trademark "Ultem"), polyarylene sulfide (available under the trademark "Fortron"), and a variety of what are commonly referred to as liquid crystal polymers (available, for example, under the trademarks "Vectra" and "Xydar"), to name a few.

Generally speaking, the present invention is practiced by forming a flat fiber material, such as a band of a multiplicity of parallel filaments for making tape, or for making sheets, and applying a heat softened long chain polymer to both sides or faces thereof. The polymer or resin is subjected to a relatively low pressure, typically in the range of between about 1 to 10 psi and preferably about 4 psi, and the fiber material is pulled past a shear zone defined by a passageway which completely surrounds the material including the resin applied to it.

At the shear zone the thickness of the passageway (perpendicular to the fiber material faces) is only nominally larger than the thickness of the fiber material. It is selected so that the resin constitutes in the range of between about 20% to 50% by weight of the prepreg tape or sheet. In general, it has been found that a shear zone resin thickness relative to the thickness of the fiber material should be about 0.2 to 0.6:1 to attain impregnation of the desired resin weight percentage. Typically, for 7 mil fiber this requires a thickness of the resin on each side of the fiber material at the shear zone in the range of between slightly above 0 to about 0.004 inch. A boundary layer of the resin in the vicinity of the fiber material surfaces is subjected to shear stresses as it passes through the shear zone. The relative movement between the fiber material and the passageway surfaces at the shear zone reorients the long chain molecules substantially parallel to the fibers. Once the molecules are parallel to the fibers the relatively low pressure applied to the resin readily forces the molecules in between and into intimate contact with the fibers and thereby assures a thorough, complete wetting of the fibers. Looking at this slightly differently, the generation of shear stresses on the resin in accordance with the present invention reduces the viscosity of the resin to such an extent that it can fully penetrate into the material and encapsulate substantially all fibers. The resulting prepreg material can then be processed into the desired article in a manner well known in the art and, therefore, not further described herein.

To prevent a bunching of the fibers during the resin impregnation step, the fibers, which are under tension as they are pulled through the shear zone, are guided along an arcuate path downstream of the shear zone which extends over an arc in the range between about 50° and 100°. This keeps the fibers, especially when making tape having substantially only longitudinally extending filaments, laterally spread and prevents them from migrating towards the center. Thus, the prepreg tape or sheet has a uniform thickness over its entire width and length.

The impregnation process of the present invention requires only low resin pressure, as indicated above. Moreover, the shear stress to reduce the viscosity of the resin is not dependent on high speed with which the fiber material passes the shear zone which, therefore can be kept low. The presently preferred speed range is between about ½ and 30 ft/min. with ½ to 5 ft/min being the presently most preferred speed range. At such low speeds it is possible to make prepreg materials using fibers having exceedingly small diameters in the micron range, for example. This makes the process of the present invention particularly well adapted to fabricate tape from very thin carbon filaments, a material in wide use in the aerospace industry because of its high strength, low weight, resistance to corrosion and its electrical characteristics. Further, at such low speed filament materials having relatively high moduli, such as boron or pitch-based graphite can be processed without significant filament damage or breakage.

A further distinct advantage attained with the present invention is that the impregnation process can be performed with relatively inexpensive, light weight and rugged equipment because it is subjected to only very low pressures and fiber speeds. For example, the passageway and other conduits through which the fiber material moves, the cavities and channels through which the softened resin flows, and the areas where the resin is applied to the faces of the fiber material need not even be sealed to prevent the escape of resin to the exterior so long as the generation of softened resin approximates the amount needed to adequately impregnate and cover the fiber material.

For the present invention to work properly it is important that the resin layers immediately adjacent the faces of the fiber material, instead of layers relatively remote therefrom, be subjected to shear stresses so that the resin can penetrate the fibers. This is achieved by maintaining the thickness of the resin at the shear zone thin, e.g. within the above stated range.

As the foregoing demonstrates, the present invention removes the main obstacle which in the past prevented the wide spread use of hot melt prepreg materials using high viscosity impregnating resin. Thus, it is now possible to take advantage of the high strength, toughness, fatigue resistance, formability and reformability, light weight and corrosion resistance of thermoplastics and similar resins. The present invention, therefore, allows one to replace metal or thermosetting materials with a material having equal or better strength to weight ratios, wear and forming characteristics while being invisible to radiation such as radar, which is of importance for certain military uses. Consequently, the present invention is ideally suited for use in the aerospace industry although it is expected to find extensive use elsewhere as well.

DETAILED DESCRIPTION OF THE PREFERRED EMBODIMENT

Figure 1:
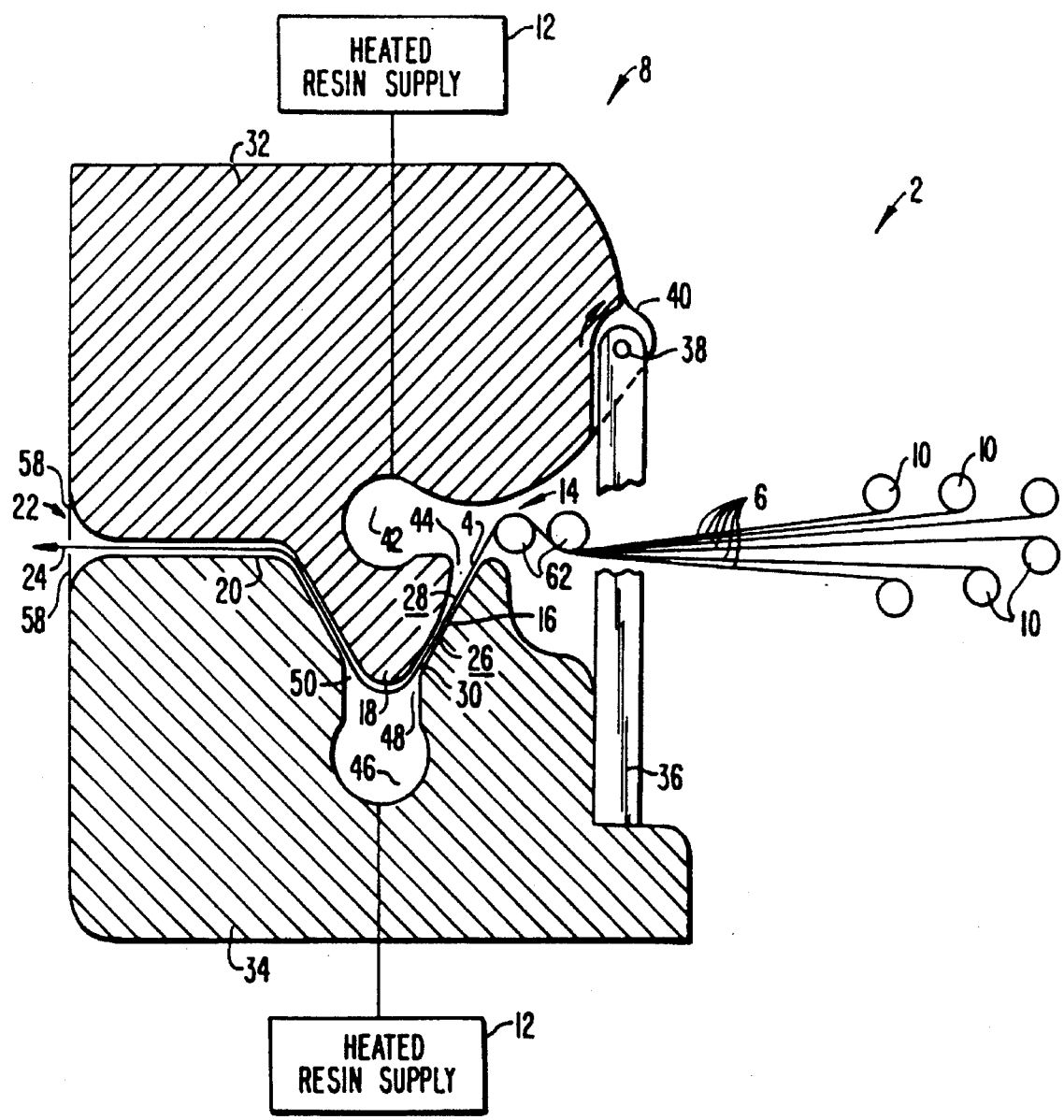
FIG. 1 is a schematic, side elevational view, partially in section, of the apparatus which is used for practicing the present invention.
Figure 2:
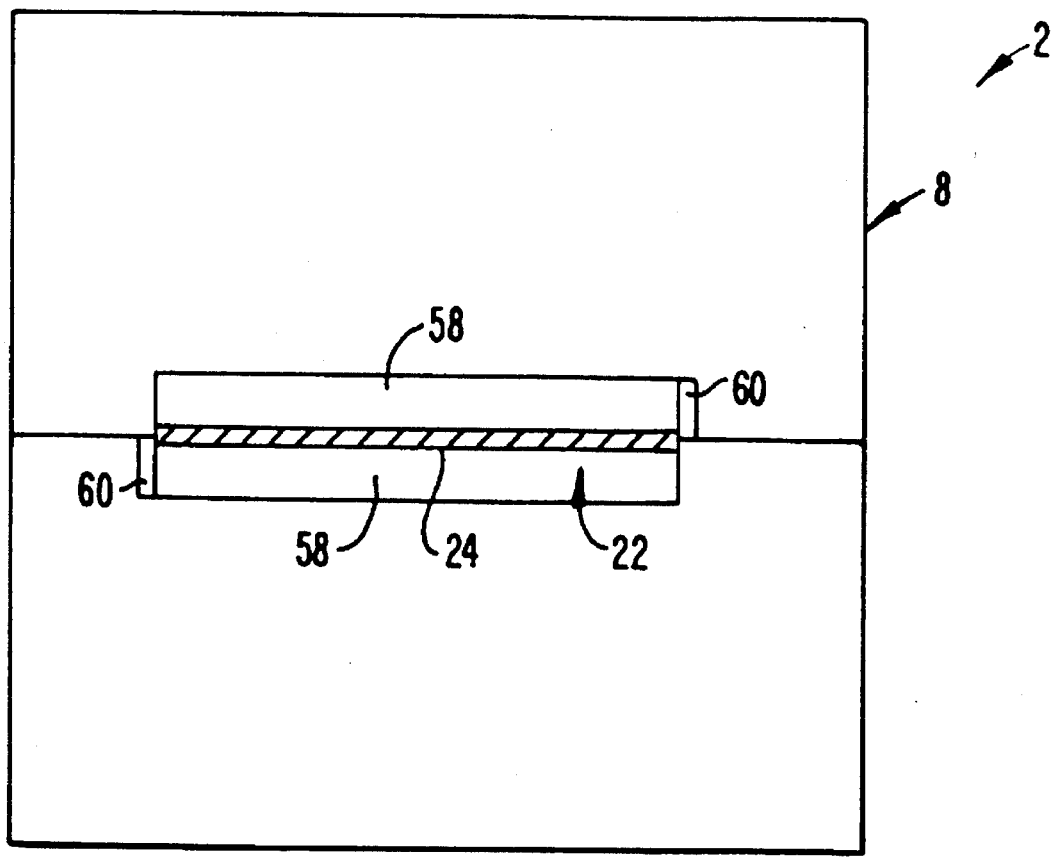
FIG. 2 is a front elevational view of the apparatus shown in FIG. 1.

Referring first to FIGS. 1 and 2, an apparatus 2 for impregnating a fiber material such as a band 4 having a multiplicity of filaments 6 comprises a die 8, filament supply spools 10 on an upstream side of the die, and a heat softened resin supply 12 (illustrated, for clarity, as two supplies in FIG. 1). As is described in more detail below, filaments from spools 10 are pulled under tension past an intake opening 14 of the die into and through a passageway 16, about an arcuate nose or projection 18 downstream of the passage, and from there through a conduit 20 and past an exit opening 22 where it is retrieved as a prepreg tape 24. Heat softened resin is applied to opposite faces 26, 28 of filament band 4 in or in the vicinity of passageway 16. In a shear zone 30 defined by the passageway the resin is fluidized, that is, its viscosity is reduced so that it can penetrate band 4 and substantially completely impregnate the filaments thereof. The prepreg tape which issues from the exit opening can be suitably wound about a core for storage or further processed into a finished or semi-finished article.

Die 8 is constructed of first and second die sections 32, 34 which are parted along a line (not illustrated in the drawings) that is coextensive with the travel path of band 4 through the die. The two sections are hingeably joined to each other by means of hingeposts 36 attached to die section 34 and a pivot pin 38 which engages the posts and ears 40 attached to die section 32. Other means, such as by securing the sections to movable platforms can be used to maintain the spaced relationship of the two die sections without departing from the scope of the present invention.

The upper die section 32 includes a softened resin cavity 42 which has an open side that fluidly communicates with intake opening 14 and an upstream end 44 of passageway 16. It is further fluidly connected with heat softened resin supply 12.

Similarly, the lower die section 34 includes a second resin supply cavity 46 which has an open side in fluid communication with a downstream end 48 of passageway 16 as well as with an upstream end 50 of conduit 20. The cavity in the lower die section is also fluidly connected with resin supply 12. Although two separate resin supplies are shown in FIG. 1 and the apparatus can be so constructed, normally only one supply is used and it is connected with both cavities via appropriate resin flow conduits (not shown).

Figure 3:
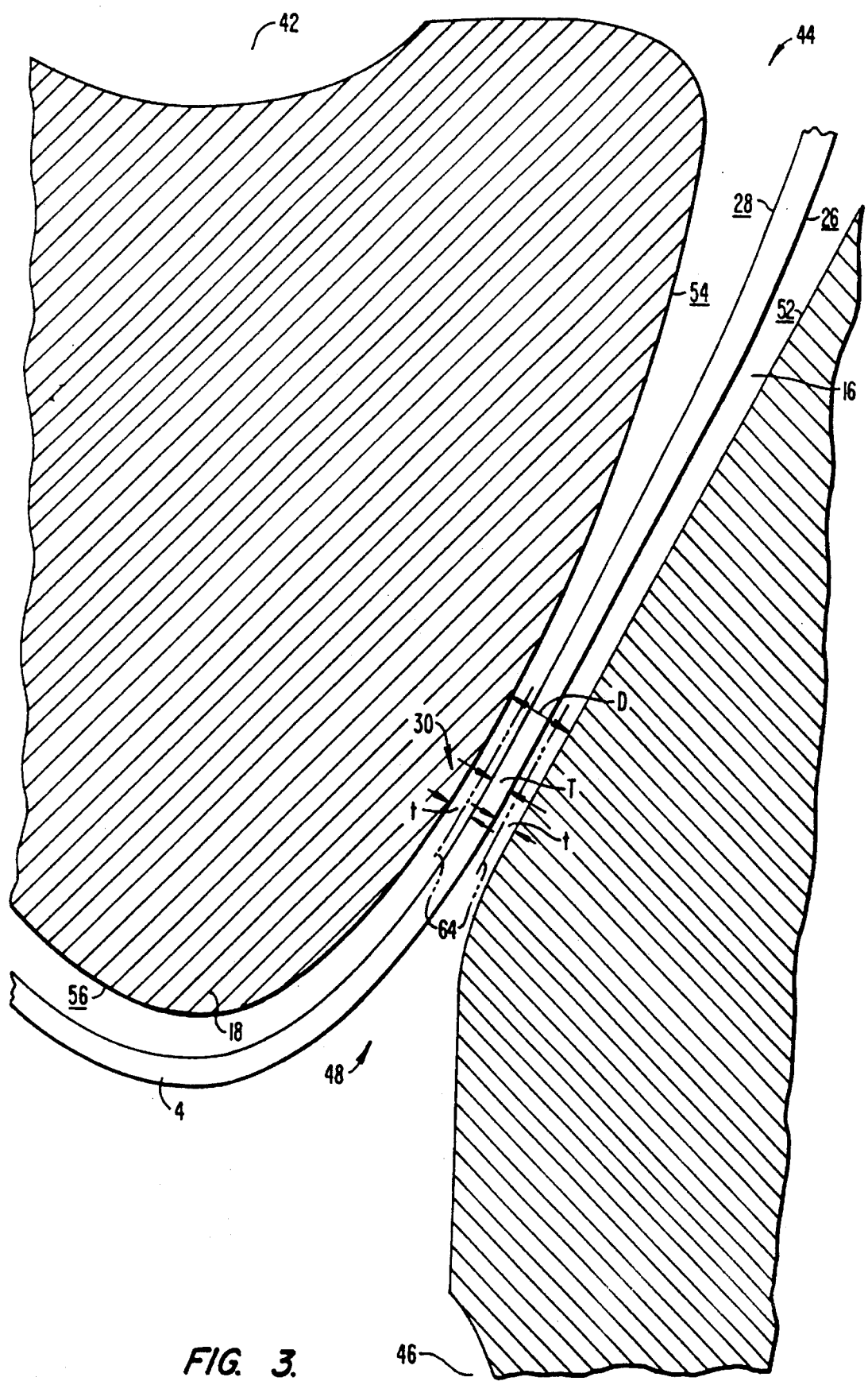
FIG. 3 is an enlarged, fragmentary, schematic view of the shear zone in the apparatus shown in FIG. 1.

Referring now to FIGS. 1 and 3, passageway 16 which extends from the upper cavity 42 to the lower cavity 46 has a width sufficient to accommodate the width of band 4, a rectangular cross section and opposing main surfaces 52, 54 which converge in a downstream direction from upstream passage end 44. The depth "D" of the passageway, measured perpendicular to the main surfaces 52, 54 reaches a minimum at the shear zone 30 which is some distance from the downstream end 48. "D" is selected so that band 4, downstream of the shear zone, has a resin content (by weight) in the range of 20% to 50%, and preferably in the range of between about 30% and 35%. For a 7 mil fiber this will normally result in a nominal resin thickness "t" on each side of band 4 between about 0 and 0.004 inch, and preferably, no more than 0.001 inch. Larger resin thicknesses in the shear zone can be tolerated such as, for example, 1.2 times the ratio of the fiber thickness, the limiting factor being the need to maintain shear within boundary layer 64. Because of the drag flow encountered with high viscosity materials, the resin thickness downstream of the shear zone is greater than the nominal thickness "t" at the shear zone. For example, when the nominal resin thickness "t" at the shear zone is no more than about 0.001 inch, the actual resin thickness downstream of the shear zone may reach about 0.004 inch.

Immediately downstream of the passageway is projection 18 that is defined by the upper die section 32 and forms an arcuate surface 56 which extends over an arc of between about 50° and 100° and is preferably about 70° to keep the drag on the tape generated by it relatively low. The arcuate surface is opposite of and communicates with the lower resin cavity 46. In use the surface is covered by tape 24 which extends over it and it guides the tape so that it travels along an arcuate path as it moves from passageway 16 toward exit 22 of the die.

Downstream of projection 18 is conduit 20 which is also in fluid communication with the lower resin cavity 46. It defines the travel path for tape 24 between the projection and the exit. The conduit has a generally rectangular cross section, a width sufficient to accommodate the tape and a depth slightly greater than the combined thickness of the tape and the resin layer on each side thereof. The primary function of the conduit is to guide the tape towards the exit.

Applicants are not certain but believe that the conduit may facilitate and enhance the further penetration of the tape by the resin shear zone. This is believed to be especially true when the transition from the lower resin cavity 46 to the conduit gradually tapers down to the desired thickness, as is illustrated in FIG. 1. However, for all practical purposes shear zone 30 effects a substantially complete penetration of the tape with resin and any additional shear in the conduit 20 is not believed to be required to practice the invention.

Exit opening 22 defines the downstream terminus of the conduit from which the prepreg tape 24 is withdrawn. Scrapers or doctor blades 58 can be provided at the exit to establish the final, overall thickness of the tape and control its resin distribution, smoothing the resin and fiber before the tape is further processed or wound into rolls for storage. The doctor blades are constructed so that removed excess resin can be suitably discharged, e.g. by providing resin discharge openings 60 (FIG. 2) at a side of each blade.

Referring to FIGS. 1–3, in use, and assuming prepreg tape 24 is to be produced, filaments for the tape are supplied in the form of filament tows, each comprising, for example, 12,000 filaments. The number of tows and of filament tow supply spools 10 is determined by the desired width and thickness of the prepreg tape 24. For a 3" wide, 0.007 inch thick tape twenty tows (and tow supply spools), each having about 12,000 carbon filament of a diameter of about 7 microns are normally used.

From the spools the tows are guided towards and then over a series of S-wrap rolls 62 along an undulating path. Because the tows are under slight tension, they spread out laterally as they travel over rolls 62 so that the filaments are closely adjacent and the band has a uniform thickness over its entire width.

Resin supply 12 feeds heat softened resin to cavities 42, 46. The resin supply can be an extruder of a conventional construction, which will normally include a hopper for receiving resin feedstock and passing it into a barrel that is suitably heated to soften the resin (not shown). A screw conveyor (not shown) in the barrel transports the heated resin via appropriate conduits to the two resin cavities in the die. Further, the resin supply includes a metering system (not separately shown) which correlates the quantity of resin being fed to the cavities with the amount of resin required to adequately impregnate the band which, for any given fiber material being impregnated, is a function of the speed with which the material is transported through the die.

To commence the resin impregnation of the tape, the filament tows are initially threaded through the die by hingeably opening the die sections and connecting the free ends of the tows with a power driven take-up mechanism (not shown) downstream of die exit 22. Upon activation it subjects all filaments of the tows to tension, thereby flattening and laterally spreading the toes into band 4 as they move over the S-wrap rolls 62.

Softened resin flows out of upper cavity 42 into contact with band surface 28 over the entire width of the band (the cavity width is about the same as the width of passageway 16). The resin, which is highly viscous, also flows toward intake opening 14 of the die. However, because of its viscosity and low pressure (e.g. 4 psi), the resin flow towards the intake is so slow that little and typically no resin oozes from the intake, especially since the band travelling towards passageway 16 drags resin that may reach the intake back towards the interior of the die.

From the intake the band 4 moves into passageway 16. As is best illustrated in FIG. 3, it is tapered by converging opposing surfaces 54, 56 in a downstream direction so that the passageway reaches its minimum depth "D" at shear zone 30 which is located between the ends of the passage. Typically, the shear zone has a length of between about ¼ inch to 1 inch, preferably it is about ½ inch long and it has a depth "D" (for tape of a 0.007 inch thickness) in the range of between about 0.007 to 0.01 inch. At the upstream end 44 the passageway has a depth (perpendicular to surfaces 54, 56) of about 0.05 inch.

Softened resin from the lower cavity 46 flows into passageway 16 from its downstream end 48 and against the direction of movement of the band 4 into contact with the other surface 26 of the band. The resin flows past the shear zone towards upstream end 44 of the passageway. Because of its high viscosity and low pressure no resin will normally ooze from the intake opening 14 of the die, especially since the moving band 4 drags the resin away from the intake.

Increasingly, as the band moves toward and especially through the shear zone the relative movement between band 4 and passageway surfaces 52, 54 subjects a boundary layer 64 of the resin in the vicinity of, i.e. substantially immediately adjacent the band surfaces 26, 28 to shear. The relative movement of the surfaces between which the softened resin is sandwiched in the shear zone causes an alignment of the long chain molecules parallel to the filaments, thereby greatly reducing the effective viscosity of the resin in the boundary layer. As a result, even the relatively low resin pressure of about 4 psi is sufficient to force the resin molecules, which are normally longer than the spacing between adjacent filaments, into the interior of the band, thereby substantially completely encapsulating all filaments thereof, which is a primary objective of the present invention.

Once the band has passed the shear zone 30 it constitutes prepreg tape 24 which has been uniformly impregnated with resin. The long chain molecules of the tape, and especially those in the vicinity of and in between the filaments are in substantial alignment with the filaments. The tape also includes a layer of resin of the desired thickness on its surfaces which, due to the earlier mentioned drag flow of the viscous resin, is slightly thicker than the difference between the passageway depth D and the band thickness T.

After the shear zone the tape passes over the arcuate surface 56 of projection 18. Since the tape is under tension the filaments are prevented from bunching up and the tape maintains its uniform thickness over its entire width as well as length. The doctor blades 58 at exit 22 control the final distribution of the resin layer of the tape. Excess resin, including resin from the lower cavity which may adhere to the side of the tape facing it is removed and suitably discharged, e.g., through doctor blades 58.

To maintain a uniform tape thickness and prevent the bunching of the filaments the tension on the tape for pulling it through the die should be as low as possible, maintaining the earlier described arc of 70° for the arcuate surface 56 facilitates this, as does a low friction mounting for filament supply spools 10, orienting the axes of the spools perpendicular (not shown) to the parting line through the die, and limiting the number of S-wrap rolls 62 to two or three.

It is ordinarily difficult to increase the width of filament tape at will; a 3 inch width is currently as wide as is feasible without unduly complicating the manufacturing process. When greater widths are desired, for example to produce large prepreg sheets, a fabric, woven mat or the like, might be substituted for the filament band 4. Preferably, however, two or more prepreg tapes are laterally joined into sheets comprising a plurality of side-by-side tapes before the sheet is molded or otherwise manufactured into a finished article.

Further, the die 8 described above and especially the hinged connection between its sections 32, 34 make it possible to use the same die to manufacture prepreg materials having differing thicknesses "T". To accommodate a band with a greater thickness, for example, all that is required is to pivotally move the die sections about pin 38 until the depth "D" of the passageway at the shear zone has been increased by an amount equal to the greater thickness of the band, thereby maintaining the same resin thickness "t". A suitable mechanism, such as a set screw or the like (not shown) is provided to lock the die sections at the selected relative positions to maintain the set passageway depth "D".

What is claimed is:

1. A method for fully impregnating multiple closely adjacent, resin-free fibers which together define an exterior surface with a normally viscous resin having linear long chain molecules, the method comprising the steps of applying the resin to the exterior surface on at least two, opposite portions of the surface; subjecting the resin applied to the surface portions to relatively low pressure urging it towards the fibers; and generating shear stresses in a layer of the resin proximate the surface portions so that the long chain molecules become aligned with the fibers; whereby the shear stresses reduce the viscosity of the resin in the vicinity of the fibers so that the resin, under the applied pressure, migrates past the surface portions into contact with the fibers.

2. A method according to claim 1 wherein the resin comprises a polymer.

3. A method according to claim 1 wherein the resin comprises a polyimide.

4. A method according to claim 3 wherein the polyimide comprises a polyetherimide.

5. A method according to claim 1 wherein the resin comprises a polyarylene sulfide.

6. A method according to claim 1 wherein the resin comprises a liquid crystal polymer.

7. A method according to claim 1 wherein the step of generating shear stresses comprises the step of contacting the resin layer opposite from the surface portions with a stationary surface, and moving the fibers relative to the stationary surface.

8. A method according to claim 7 including the step of restricting the thickness of the resin between the stationary surface and the surface portions to between about 0.2 to 0.6 times the thickness of the fiber.

9. A method according to claim 1 wherein the step of subjecting the resin to pressure comprises the step of subjecting it to a pressure no greater than about 10 psi.

10. A method of forming a resin-impregnated fiber material comprising the steps of arranging initially resin-free fibers so that they form a substantially flat, elongated initially resin-free structure; applying a long molecular chain polymer material to each side of the structure; moving the structure in a downstream direction; subjecting the polymer material applied to the structure to a pressure of no more than about 10 psi; limiting the thickness of the polymer material on each side of the structure to no more than about 1.2 times the thickness of the fiber; and contacting the polymer material opposite from the structure sides with a stationary surface; whereby downstream movement of the structure generates relative movements in the polymer material which subjects it to shear, thereby lowers its viscosity by aligning long chain molecules in the polymer material with the fiber of the structure and causes the polymer material to migrate under the applied pressure into the structure and about the fibers thereof.

11. A method according to claim 10 wherein the step of contacting comprises the steps of forming a stationary passage surrounding the structure and defining the stationary surfaces in contact with the polymer material.

12. A method according to claim 11 wherein the passage is elongated in the direction of structure movement from an upstream end to a downstream end of the passage; and including the step of reducing the depth of the passage in a direction perpendicular to the structure sides from the upstream towards the downstream end so that the passage forms a shear zone intermediate the ends where the depth of the passage is no more than about 0.6 times the thickness of the structure.

13. A method according to claim 12 wherein the step of applying comprises the step of applying the polymer material to a first side of the structure at a location upstream of the shear zone, applying the polymer material to a second side of the structure at a location downstream of the shear zone; and flowing the polymer material from the locations towards and past the shear zone.

14. A method according to claim 13 including the step of subjecting the polymer material to a pressure of no more than about 10 psi.

15. A method according to claim 10 wherein the fibers comprise a multiplicity of substantially parallel filaments extending in the downstream direction, wherein the step of moving comprises the step of subjecting the filaments to a tension force moving the filaments in the downstream direction; and including the step of maintaining the filaments laterally spread to define a tape-like structure by moving the filaments, while under tension, through an arcuate path extending over an arc of at least about 50°.

16. A method of forming a tape-like structure having a multiplicity of longitudinally extending, substantially parallel, side-by-side filaments and which is fully pre-impregnated with a long molecular chain polymer material, the method comprising the steps of: arranging the filaments to define a structure of substantially uniform thickness; tensioning the filaments; moving the filaments while under tension through an elongated passage having an upstream end where the filaments enter the passage and a downstream end where they exit the passage, the passage being shaped to accommodate the structure formed by the filaments and having tapered surfaces opposite sides of the structure which converge from the upstream end of the passage in a downstream direction to define a shear zone in the passage where the depth of the passage exceeds the thickness of the structure by no more than about 0.6 times the thickness of the structure; heating the polymer material to render it viscous; subjecting the viscous polymer material to a pressure of no more than about 10 psi; applying the heated, pressurized polymer to a first side of the band upstream of the upstream end of the passage and to a second side of the band downstream of a downstream end of the passage; flowing the heated, pressurized polymer material into the passage and past the shear zone; whereby the downstream movement of the filaments through the shear zone subjects a boundary layer of the polymer material proximate the faces of the structure to shear, which reduces viscosity of the polymer material so that it migrates under the applied pressure into the interior of the structure into substantial contact with all fibers; and guiding the structure downstream of the shear zone through an arc of at least about 50°.

17. A method according to claim 16 wherein the step of guiding comprises the step of forming an arcuate protrusion extending over the arc of about 70° and moving the structure over the protrusion while the filaments are under tension.

18. A method according to claim 16 including the step of forming a conduit downstream of the passage terminating in an exit opening; and moving the structure after it exits the passages through the conduit and past the exit opening.

19. A method according to claim 16 wherein the step of arranging comprises the steps of providing a plurality of filament tows, each tow comprising a multiplicity of substantially parallel filaments; passing the tows, while the filaments are under tension and upstream of the passage through an undulating path so that the filaments of each to spread laterally to thereby form a tape of substantially uniform thickness.

20. A method according claim 16 wherein the filaments comprise part of a fabric having longitudinally extending filaments and generally transversely oriented, interconnecting fibers.

21. A method according to claim 20 wherein the fabric comprises a woven fabric.

22. A method according to claim 21 wherein the step of moving comprises the step of moving the structure at a speed in the range of between about ½ to 10 feet per minute.

23. A method according to claim 16 wherein the step of moving comprises the step of moving the structure at a speed in the range of between about ½ to 30 feet per minute.

24. A method for impregnating a structure formed of closely adjacent, initially resin-free filaments with a resin including linear, long chain molecules comprising the steps of heat softening the resin and applying it to sides of the structure, subjecting the softened resin applied to the sides to a pressure up to about 10 psi, and subjecting a boundary layer of the resin adjacent the sides to shear stress to thereby align the long chain molecules adjacent the structure sides with the filaments so that the molecules penetrate between the filaments under the applied pressure and fully contact the filaments.

25. A method for impregnating a structure formed of a multiplicity of closely adjacent, parallel, initially resin-free filaments with a resin having long chain molecules, the method comprising the steps of heat softening the resin and applying it to sides of the structure, aligning long chain molecules in a boundary layer of the resin adjacent the sides substantially parallel to the filaments by contacting the resin with a surface and moving the surface relative to the structure, and forcing the aligned molecules in between adjacent filaments to thereby contact substantially the entire outer surface areas of the filaments with the resin.

26. A method according to claim 25 wherein the resin is a polymer.

27. A method according to claim 25 wherein the step of forcing comprises the step of subjecting the resin applied to the sides of the structure to a pressure up to about 10 psi.

28. A method according to claim 25 wherein the step of aligning comprises the step of mechanically aligning the long chain molecules with the filaments.

29. A method according to claim 25 wherein the step of aligning comprises the step of contacting a portion of the resin applied to the sides of the structure with a surface, and moving the sides of the structure and the surface relative to each other in a direction substantially parallel to the filaments.

30. A method for impregnating a structure formed of closely adjacent, parallel, initially resin-free filaments with a polymer having long chain molecules of a length substantially greater than a spacing between adjacent filaments, the method comprising the steps of softening the polymer and applying it to sides of the structure, contacting the polymer applied to the sides of the structure with a surface and moving the surface relative to the structure so that long chain molecules in the vicinity of the sides become aligned with the filaments, and thereafter subjecting the polymer applied to the sides of the structure to pressure to force aligned long chain molecules in between adjacent filaments and thereby substantially completely contact exterior surfaces of the filaments with the polymer.

* * * * *